(12) United States Patent
Van Dyke Parunak et al.

(10) Patent No.: US 8,112,374 B2
(45) Date of Patent: Feb. 7, 2012

(54) HIERARCHICAL ANT CLUSTERING AND FORAGING

(76) Inventors: Henry Van Dyke Parunak, Ann Arbor, MI (US); Theodore C. Belding, Ann Arbor, MI (US); Sven Brueckner, Dexter, MI (US); Paul Chiusano, Medford, MA (US); Peter Weinstein, Saline, MI (US)

( * ) Notice: Subject to any disclaimer, the term of this patent is extended or adjusted under 35 U.S.C. 154(b) by 772 days.

(21) Appl. No.: 11/562,437

(22) Filed: Nov. 22, 2006

(65) Prior Publication Data
US 2007/0179944 A1    Aug. 2, 2007

Related U.S. Application Data

(60) Provisional application No. 60/739,496, filed on Nov. 23, 2005.

(51) Int. Cl.
   G06F 17/00    (2006.01)
   G06N 5/02    (2006.01)
(52) U.S. Cl. ............................ 706/45; 706/20; 706/14
(58) Field of Classification Search .................. None
   See application file for complete search history.

(56) References Cited

U.S. PATENT DOCUMENTS

| | | | |
|---|---|---|---|
| 5,442,778 A * | 8/1995 | Pedersen et al. | 707/5 |
| 6,622,139 B1 * | 9/2003 | Nakayama et al. | 707/3 |
| 7,003,509 B2 * | 2/2006 | Andreev | 1/1 |
| 2004/0103105 A1 * | 5/2004 | Lindblad et al. | 707/100 |
| 2005/0154701 A1 * | 7/2005 | Parunak et al. | 707/1 |

OTHER PUBLICATIONS

Cowgill et al., M., "A Genetic Algorithm Approach to Cluster Analysis", Journal of Computers and Mathematics with Applications 37, p. 99-108, 1999.*
Belding, T., "The Distributed Genetic Algorithm", Proceedings of the Sixth International Conference on Genetic Algorithms, 1995.*
Kargupta et al., H., "Scalable, Distributed Data Mining Using An Agent Based Architecture", Preceedings of High Performance Comuting, 1997.*
J. Beal. "Leaderless Distributed Hierarchy Formation". AIM-2002-021, MIT, Cambridge, MA, 2002. http://www.swiss.ai.mit.edu/projects/amorphous/papers/AIM-2002-021.ps.
E. Bonabeau, G. Theraulaz, V. Fourcassié, and J.-L. Deneubourg. "The Phase-Ordering Kinetics of Cemetery Organization in Ants." Physical Review E, 4:4568-4571, 1998. http://www.santafe.edu/research/publications/workingpapers/98-01-008.ps.

(Continued)

Primary Examiner — Jeffrey A Gaffin
Assistant Examiner — Adrian Kennedy
(74) Attorney, Agent, or Firm — Wayne Edward Ramage; Baker Donelson (57) ABSTRACT

A clustering method yields a searchable hierarchy to speed retrieval, and can function dynamically with a changing document population. Nodes of the hierarchy climb up and down the emerging hierarchy based on locally sensed information. Like previous ant clustering algorithms, the inventive process is dynamic, decentralized, and anytime. Unlike them, it yields a hierarchical structure. For simplicity, and reflecting our initial application in the domain of textual information, the items being clustered are documents, but the principles may be applied to any collection of data items.

21 Claims, 2 Drawing Sheets

High-Level View of HAC.—A hierarchy consists of a root (a), a set of leaves (c, the documents or data items being clustered), and an arbitrary number of internal nodes (b). The arrow designates an "active node" (see text).

OTHER PUBLICATIONS

Cutting et al., "Scatter/Gather: A Cluster-based Approach to Browsing Large Document Collections", 1992 ACM, 15th Ann Int'l SIGIR '92, pp. 318-325.*

L. Chen, X. Xu, Y. Chen. "A Novel Ant Clustering Algorithm Based on Cellular Automata." In Proceedings of International Joint Conference on Web Intelligence and Intelligent Agent Technology (WI'04 and IAT'04), Beijing, PRC, 2004.

J. L. Deneubourg, S. Goss, N. Franks, A. Sendova-Franks, C. Detrain, and L. Chretien. "The Dynamics of Collective Sorting: Robot-Like Ants and Ant-Like Robots." In J. A. Meyer and S. W. Wilson, Editors, From Animals to Animats: Proceedings of the First International Conference on Simulation of Adaptive Behavior, pp. 356-365. MIT Press, Cambridge, MA, 1991.

J. Handl, J. Knowles, and M. Dorigo. "Ant-based clustering: a comparative study of its relative performance with respect to k-means, average link and 1d-som." TR-IRIDIA-2003-24, IRIDIA, 2003. http://wwwcip.informatik.uni-erlangen.de/~sijuhand/TR-IRIDIA-2003-24.pdf.

J. Handl and B. Meyer. "Improved ant-based clustering and sorting in a document retrieval interface." In Proceedings of Parallel Problem Solving from Nature (PPSN VII), Springer, 2002. http://dbk.ch.umist.ac.uk/handl/HandlMeyerPPSN2002.pdf.

A. K. Jain, M. N. Murty, and P. J. Flynn. "Data Clustering: A Review." ACM Computing Surveys, 31(3), 1999.

P. Kuntz and P. Layzell. "An Ant Clustering Algorithm Applied to Partitioning in VLSI Technology." In Proceedings of Fourth European Conference on Artificial Life, pp. 417-424, MIT Press, 1997. http://www.informatics.sussex.ac.uk/users/adrianth/lazwebpag/web/Publications/ECAL97/ecalps.ps.

N. Monmarché. "On data clustering with artificial ants." (believed to have been offered for sale publicly used, and/or published prior to the filling date of this application), Published 1999.

E. Ogston, B. Overeinder, M. V. Steen, and F. Brazier. "A Method for Decentralized Clustering in Large Multi-Agent Systems." In Proceedings of Second International Joint Conference on Autonomous Agents and Multi-Agent Systems, Melbourne, Australia, pp. 789-796, 2003. http://citeseer.ist.psu.edu/ogston03method.html.

C. F. Olson. "Parallel Algorithms for Hierarchical Clustering." Parallel Computing, 21:1313-1325, 1995. http://citeseer.ist.psu.edu/olson95parallel.html.

S. A. Oprisan. "Task Oriented Functional Self-Organization of Mobile Agents Team: Memory Optimization Based on Correlation Feature." In Proceedings of Ant Colony Optimization and Swarm Intelligence (ANTS 2004), Brussels, Belgium, pp. 398-405, Springer, 2004. http://springerlink.metapress.com/openurl.asp?genre=article&issn=0302-9743&volume=3172&spage=398.

H. V. D. Parunak, S. A. Brueckner, R. Matthews, and J. Sauter. "Pheromone Learning for Self-Organizing Agents." IEEE SMC, 35(3 (May)):316-326, 2005. http://www.altarum.cet/~vparunak/ParunakIEEE.pdf.

H. V. D. Parunak, S. A. Brueckner, J. A. Sauter, and R. Matthews. "Global Convergence of Local Agent Behaviors." In Proceedings of Fourth International Joint Conference on Autonomous Agents and Multi-Agent Systems (AAMAS05), Utrecht, The Netherlands, pages (forthcoming), 2005. http://www.altarum.net/~vparunak/AAMAS05Converage.pdf.

V. Ramos and A. Abraham. "Evolving a Stigmergic Self-Organized Data-Mining." In Proceedings of 4th Int. Conf. on Intelligent Systems, Design and Applications (ISDA-04), Budapest, Hungary, pp. 725-730, 2004. http://alfa.ist.utl.pt/~cvrm/staff/vramos/ref_50.html.

R. Rohwer. "Summary Statistics to Support Information-Based Distributed Hierarchical Clustering." Fairlsaac, San Diego, CA, 2005.

S. Schockaert, M. de Cock, C. Cornelis, and E. E. Kerre. "Efficient Clustering with Fuzzy Ants." In Proceedings of Ant Colony Optimization and Swarm Intelligence (ANTS 2004), Brussels, Belgium, pp. 342-349, 2004. http://springerlink.metapress.com/openurl.asp?genre=article&issn=0302-9743&volume=3172&spage=342.

B. Walsham. Simplified and Optimised Ant Sort for Complex Problems: Document Classification. Bachelor of Software Engineering Thesis at Monash University, Department of School of Computer Science and Software Engineering, 2003. http://www.csse.monash.edu.au/hons/se-projects/2003/Walsham/Benjamin_Walsham_Thesis_Main.pdf.

P. Kuntz, P. Layzell, and D. Snyers. "A Colony of Ant-Like Agents for Partitioning in VLSI Technology." (believed to have been offered for sale, publicly used, and/or published prior to the filing date of this application), Published 1997.

* cited by examiner

Figure 1: Ant clustering convergence. The solid line shows the exponential fit.

FIGURE 1

Figure 2: Effect of changing document population during a run (all populations start at ~17221 and end at N). λ for all curves is essentially the same.

HIERARCHICAL ANT CLUSTERING AND FORAGING

REFERENCE TO RELATED APPLICATION

This application claims priority from U.S. Provisional Patent Application Ser. No. 60/739,496, filed Nov. 23, 2005, the entire content of which is incorporated herein by reference.

FIELD OF THE INVENTION

This invention relates generally to clustering algorithms and, in particular, to a hierarchical clustering method that yields a searchable hierarchy to speed retrieval, and can function dynamically with changing data.

BACKGROUND OF THE INVENTION

Clustering is a powerful and widely used tool for discovering structure in data. Classical algorithms [9] are static, centralized, and batch. They are static because they assume that the data being clustered and the similarity function that guides the clustering do not change while clustering is taking place. They are centralized because they rely on common data structures (such as similarity matrices) that must be accessed, and sometimes modified, at each step of the operation. They are batch because the algorithm runs its course and then stops.

Some modern information retrieval applications require ongoing processing of a massive stream of data. This class of application imposes several requirements on the process that classical clustering algorithms do not satisfy.

Dynamic Data and Similarity Function.—Because the stream continues over a length period of time, both the data being clustered and users' requirements and interests may change. As new data enters, it should be able to find its way in the clustering structure without the need to restart the process. If the intrinsic structure of new data eventually invalidates the organization of older data, that data should be able to move to a more appropriate cluster. A model of the user's interest should drive the similarity function applied to the data, motivating the need to support a dynamic similarity function that can take advantage of structure compatible with both old and new interests while adapting the structure as needed to take account of changes in the model.

Decentralized.—Because of the massive nature of the data, the centralized constraint is a hindrance. Distributed implementations of centralized systems are possible, but the degree of parallel execution is severely limited by the need to maintain the central data structure as the clustering progresses. One would like to use parallel computer hardware to scale the system to the required level, with nearly linear speed-up.

Any-time.—Because the stream is continual, the batch orientation of conventional algorithms, and their need for a static set of data, is inappropriate. The clustering process needs to run constantly, providing a useful (though necessarily approximate) structuring of the data whenever it is queried.

Biological ants cluster the contents of their nests using an algorithm that is dynamic, decentralized, and anytime. Each ant picks up items that are dissimilar to those it has encountered recently, and drops them when it finds itself among similar items. This approach is dynamic, because it easily accommodates a continual influx of new items to be clustered without the need to restart. It is decentralized because each ant functions independently of the others. It is anytime because at any point, one can retrieve clusters from the system. The size and quality of the clusters increase as the system runs.

Previous researchers have adapted this algorithm to practical applications, but (like the ant exemplar) these algorithms produce only a partitioning of the objects being clustered. Particularly when dealing with massive data, a hierarchical clustering structure is far preferable. It enables searching the overall structure in time logarithmic in the number of items, and also permits efficient pruning of large regions of the structure if these are subsequently identified as expendable.

Natural Ant Clustering

An ant hill houses different kinds of things, including larvae, eggs, cocoons, and food. The ant colony keeps these entities sorted by kind. For example, when an egg hatches, the larva does not stay with other eggs, but is moved to the area for larvae. Computer scientists have developed a number of algorithms for sorting things, but no ant in the ant hill is executing a sorting algorithm.

Biologists have developed an algorithm that is compatible with the capabilities of an ant and that yields collective behavior comparable to what is observed in nature [2, 4]. Each ant executes the following steps continuously:

1. Wander randomly around the nest.
2. Sense nearby objects, and maintain a short memory (about ten steps) of what has been seen.
3. If an ant is not carrying anything when it encounters an object, decide stochastically whether or not to pick up the object. The probability of picking up an object decreases if the ant has recently encountered similar objects. In the emulation, the probability of picking up an object is $$p(\text{pickup})=(k^+/(k^++f))^2$$

where f is the fraction of positions in short-term memory occupied by objects of the same type as the object sensed and $k^+$ is a constant. As f becomes small compared with $k^+$, the probability that the ant will pick up the object approaches certainty.

4. If an ant is carrying something, at each time step decide stochastically whether or not to drop it, where the probability of dropping a carried object increases if the ant has recently encountered similar items in the environment. In the emulation, $$p(\text{putdown})=(f/(k^-+f))^2$$

where f is the fraction of positions in short-term memory occupied by objects of the same type as the object carried, and $k^-$ is another constant. As f becomes large compared with $k^-$, the probability that the carried object will be put down approaches certainty.

The Brownian walk of individual ants guarantees that wandering ants will eventually examine all objects in the nest. Even a random scattering of different items in the nest will yield local concentrations of similar items that stimulate ants to drop other similar items. As concentrations grow, they tend to retain current members and attract new ones. The stochastic nature of the pick-up and drop behaviors enables multiple concentrations to merge, since ants occasionally pick up items from one existing concentration and transport them to another The put-down constant $k^-$ must be stronger than the pick-up constant $k^+$, or else clusters will dissolve faster than they form. Typically, $k^+$ is about 1 and $k^-$ is about 3. The length of short-term memory and the length of the ant's step in each time period determine the radius within which the ant compares objects. If the memory is too long, the ant sees the entire nest as a single location, and sorting will not take place.

Previous Engineered Versions

Several researchers have developed versions of the biological algorithm for various applications. These implementations fall into two broad categories: those in which the digital ants are distinct from the objects being clustered, and those that eliminate this distinction. All of these examples form a partition of the objects, without any hierarchical structure. In addition, we summarize in this section previous non-ant approaches to the problem of distributing clustering computations.

Distinct Ants and Objects

A number of researchers have emulated the distinction in the natural ant nest between the objects being clustered and the "ants" that carry them around. All of these examples cluster objects in two-dimensional space.

Lumer and Faieta [12] present what is apparently the earliest example of such an algorithm. The objects being clustered are records in a database. Instead of a short-term memory, their algorithm uses a measure of the similarity among the objects being clustered to guide the pick-up and drop-of actions.

Kuntz et al. [11] apply the Lumer-Faieta algorithm to partitioning a graph. The objects being sorted are the nodes of the graph, and the similarity among them is based on their connectivity. Thus the partitioning reflects reasonable component placement for VLSI design.

Hoe et al. [8] refine Lumer and Faieta's work on data clustering by moving empty ants directly to available data items. Handl et al. [6] offer a comparison of this algorithm with conventional clustering algorithms.

Handl and Meyer [7] cluster documents returned by a search engine such as Google, to generate a topic map. Documents are characterized by a keyword vector of length n, thus situating them in an n-dimensional space. This space is then reduced using latent semantic indexing, and then ant clustering projects them into two dimensions for display. This multistage process requires a static document collection.

These efforts use only document similarity to guide clustering. Ramos [20] adds a pheromone mechanism. Ants deposit digital pheromones as they move about, thus attracting other ants and speeding up convergence.

Walsham [23] presents a useful summary of the Lumer-Faieta and Handl-Meyer efforts and studies the performance of these algorithms across their parameter space.

Oprisen [17] applies the Deneubourg model to foraging robots, and explores convergence speed as a function of the size of the memory vector that stores the category of recently encountered objects.

Monmarché [14] clusters data objects on a two-dimensional grid, basing drop-off probabilities on fixed similarity thresholds. Inter-object distance is the Euclidean distance between the fixed-length vectors characterizing the objects. To speed convergence, once initial clusters have formed, K-means is applied to merge stray objects. Then the sequence of ant clustering and K-means is applied again, this time to whole clusters, to merge them at the next level. The distinction between the smaller clusters is not maintained when they are merged, so that the potential for generating a true hierarchy is not realized. Kanade and Hall [10] use a similar hybrid process, employing fuzzy C-means instead of K-means as the refinement process. The staged processing in these models has the undesirable consequence of removing them from the class of any-time algorithms and requiring that they be applied to a fixed collection of data.

Schockaert et al. [22] also merge smaller clusters into larger ones, but using a real-time decision rule that tells an ant whether to pick up a single object or an entire cluster. Thus their algorithm, unlike Monmarché's, can accommodate a dynamic document population.

Active Objects

A natural refinement of these algorithms eliminates the distinction between ant and object. Each object is active, and can move itself.

Beal [1] addresses the problem of discovering a hierarchical organization among processors in an amorphous computing system. The nodes themselves are fixed, but efficient processing requires grouping them into a hierarchy and maintaining this hierarchy if the medium is divided or merged or if some processors are damaged. Processors form groups based on their distance from each other: they find neighbors and elect leaders. These leaders then repeat the process at the next level. The similarity function is implicit in the RF communication connectivity and conforms to a low-dimensional manifold, very different from the topology induced by document similarity.

Chen et al [3] apply the active object model to clustering data elements on a two-dimensional grid. They invoke the dissimilarity of data objects as the distance measure which drives clustering, but do not develop this dissimilarity in detail. They are particularly concerned to manage the processor cycles consumed by the document agents (a concern that is managed in the systems of the previous section by limiting the number of ants). Their solution is to have documents fall asleep when they are comfortable with their surroundings, awakening periodically to see if the world has changed.

Figure 1:
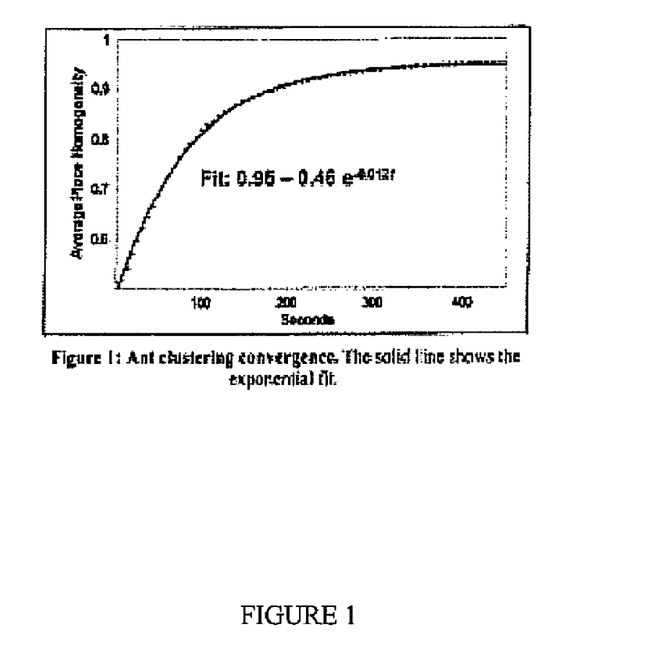
FIG. 1 shows an ant clustering convergence.
Figure 2:
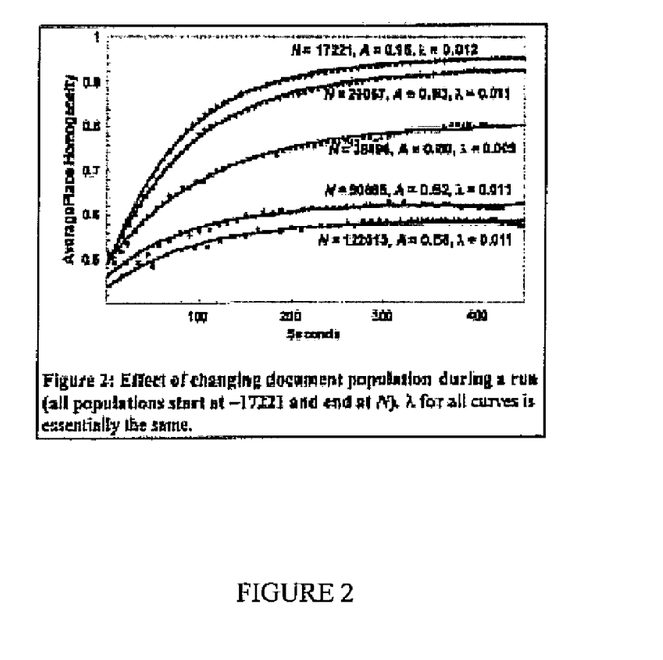
FIG. 2 shows the effect of changing document population during a run.

We have implemented [19] a flat clustering mechanism with active objects. The other algorithms discussed so far form clusters on a two-dimensional manifold, but our algorithm clusters them on a graph topology reflecting the interconnections between processors in a computer network. The nodes of the graph are places that can hold a number of documents, and documents move from one place to another. Each document is characterized by a concept vector. Each element of the concept vector corresponds to a subsumption subtree in WordNet [5, 13], and has value 1 if the document contains a lexeme in the WordNet subtree, and 0 otherwise. Similarity between documents is the cosine distance between their concept vectors. Each time a document is activated, it compares itself with a sample of documents at its current node and a sample of documents at a sample of neighboring nodes, and probabilistically decides whether to move. This algorithm converges exponentially fast (FIG. 1) [19], even when documents are added while the process runs (FIG. 2). To manage the computational cost of the active objects, each one uses pheromone learning [18] to modulate its computational activity based on whether recent activations have resulted in a move or not.

Non-Ant Distributed Clustering

There has been some work on distributed clustering not using the ant paradigm.

Olson [16] summarizes a wide range of distributed algorithms for hierarchical clustering. These algorithms distribute the work of computing inter-object similarities, but share the resulting similarity table globally. Like centralized clustering, they form the hierarchy monotonically, without any provision for documents to move from one cluster to another. Thus they are neither dynamic nor anytime.

Ogston et al. [15] consider a set of agents distributed over a network, initially with random links to one another. Agents form clusters with their closest neighbors, and share their own links with those neighbors to expand the set of agents with whom they can compare themselves. The user specifies the maximum desired cluster size, to keep clusters from growing too large. This system is naturally distributed, anytime, and could reasonably be applied to dynamic situations, but it creates only a partitioning of documents, not a hierarchy.

Synopsis

All previous work on ant clustering other than our own clusters documents spatially on a two-dimensional manifold. In addition, some of these algorithms are multi-stage processes that cannot be applied to a dynamically changing collection of documents, and even those that could be applied to such a collection have not been analyzed in this context. All of the previous ant clustering work produces a flat partition of documents, and thus does not offer the retrieval benefits of a hierarchical clustering.

SUMMARY OF THE INVENTION

This invention resides in a hierarchical clustering method that is inspired by previous ant clustering algorithms. The method yields a searchable hierarchy to speed retrieval, and can function dynamically with a changing document population. Nodes of the hierarchy climb up and down the emerging hierarchy based on locally sensed information. Like previous ant clustering algorithms, the inventive process is dynamic, decentralized, and anytime. Unlike them, it yields a hierarchical structure. For simplicity, and reflecting our initial application in the domain of textual information, the items being clustered are designated as documents, but the principles may be applied to any collection of data items.

DETAILED DESCRIPTION OF THE INVENTION

This section outlines the hierarchical ant clustering (HAC) algorithm, describes an ant-based searching algorithm that can run concurrently with the clustering process, and discusses the performance of the system.

Algorithm

We introduce the algorithm at an abstract level, then describe its components, and finally discuss alternative detailed implementations.

Abstract View

To frame the discussion, we first consider the nature of the data structure we want to achieve, and then propose some simple operations that can construct and maintain it.

Objective: A Well-Formed Hierarchy

Figure 3:
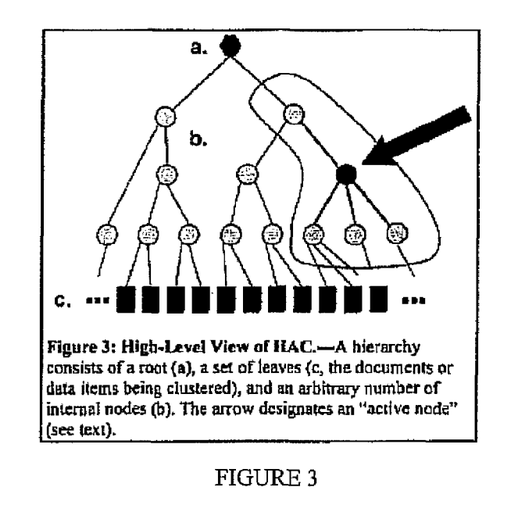
FIG. 3 shows a high-level view of hierarchical ant clustering.

FIG. 3 is a schematic of a hierarchy. All data lives in the leaves. We constrain neither depth of the hierarchy, nor the branching factor of individual nodes. The set of all nodes $N = R \cup L \cup I$ has three subclasses:

1. The set of root nodes R has one member, the root, which is an ancestor of all the other nodes, and has no distinct parent. (For simplicity in describing the algorithm, it is convenient to consider the root as its own parent.)
2. The set of leaf nodes L represents the data items being clustered. Leaves have no children.
3. All other nodes are internal nodes, elements of I. Each internal node has exactly one parent, and one or more children that may be either leaves or other internal nodes.

We define two set-valued functions of a node. children(i) $\subset L \cup I$ includes all the nodes that are children of node i, and desc(i) $\subset L$ is the set of leaves that descend (directly or indirectly) from node i. children(i)=desc(i)=$\emptyset$ (the empty set) if i$\in$L. We envision a search process that selects among the children of a node in time proportional to the number of children.

Each node i is characterized by a measure called "homogeneity," H(i), which estimates the collective similarity among desc(i). Later we will consider possible measures for homogeneity, but for now we observe the following constraints that any reasonable measure should satisfy:

1. H(i)$\in$[0,1], where H(i)=0 indicates that desc(i) are completely dissimilar from one another, and 1 indicates that they are completely similar to one another. "Dissimilar" and "similar" are defined with respect to the user's interests.
2. For any leaf i, H(i)=1. A leaf is perfectly homogeneous.
3. For any non-leaf node j, H(j) is a function of the complete set of documents currently subsumed by the node, and ideally does not depend on the internal structure of the hierarchy. Because we require only that H(j) estimates the similarity among leaf nodes, it is possible in practice that H(j) may vary with the structure, but we prefer measures that minimize such dependency.
4. In a well ordered hierarchy, if n, p, and c are the indices of a node, its parent, and one of its children, we expect H(p)<H(n)<H(c). That is, homogeneity should increase monotonically as one descends the hierarchy. We call this characteristic of a well-ordered hierarchy, the Homogeneity Monotonicity Condition (HMC). Deviations from HMC indicate regions of the hierarchy that are not well ordered, and that should be restructured.

The HMC is a necessary condition for a well-formed hierarchy, but not a sufficient one. Two other criteria should be kept in mind.

1. All of the children of a node should be similar to one another. One way of quantifying this is to require that the removal of any one child from a node should have minimal impact on its homogeneity. Let j=parent(i), and let j\i represent a node having all the children of j except for i. Then we can define the contribution of node i to the homogeneity of its parent cont(i)=H(j)−H(j\i)$\in$[−1, +1]. We would like the difference between the maximum and minimum values of cont(i) for i$\in$children(j) to be minimal. Call this difference (which is between 0 and 2) a node's "dispersion." We seek hierarchies that minimize the dispersion at each node, a condition we call the Dispersion Minimization Condition, or DMC. (The difference between homogeneity and dispersion is analogous to the difference between the average of a set of numbers and their variance. Low homogeneity is consistent with either high or low dispersion, but high homogeneity requires low dispersion.)
2. Depending on the application, it may be desirable to control the branching factor k of the tree. In a tree with constant k, the depth of the tree for a population of N documents is d=$\log_k(N)$. The search time at each node is k, so if all documents are of equal interest, the overall search time required to descend to a leaf will be k*d=k*$\log_k(N)$, which is minimal (for integral k) for k=3, and larger k at some nodes will slow the search. If documents are of different degrees of interest and if each node consumes a fixed amount of computational hardware, one might prefer k>3 for regions of the hierarchy subsuming uninteresting documents to minimize the hardware needed to support these regions. In some cases one may prefer to let k grow beyond 3, particularly at internal nodes next to the leaves. For example, if there are 27 identical documents in the population, it would be artificial to build a k subtree of depth 3 to store them, and preferable to store them under a single node with k=27 and homogeneity 1. In this case, the node's high homogeneity will inform a search that the documents are equal, so that any one can be selected without examining them all.

Operations: Promote and Merge

Because of the desired "any-time" property, we begin by considering a hierarchy that has already formed, and define decentralized processes that can improve it incrementally. Later we consider starting the system as a special case, and show that the same mechanisms can handle this case as well.

The unit of processing in HAC is a single non-leaf node, the active node. This node knows its parent and its children. (Since the active node is the parent of its children, the word "parent" is ambiguous. We use "grandparent" to refer to the parent of the active node.) It can estimate the local quality of the hierarchy by comparing its homogeneity with that of its children, and by computing its dispersion. It seeks to improve these qualities by manipulating them with two operations, Promote and Merge. (If the homogeneity is exact, neither operation will change the homogeneity of the grandparent, since the set of leaves subsumed by the grandparent remains unchanged. However, if homogeneity is an approximate estimate, it may change.)

Figure 4:
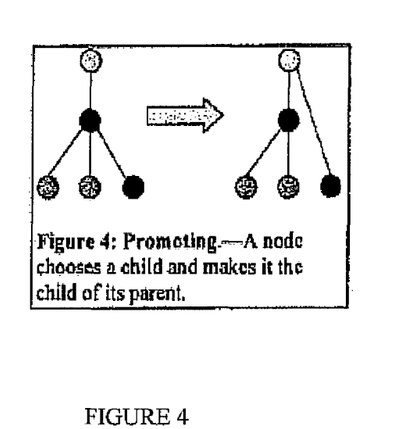
FIG. 4 illustrates promoting; a node choosing one of its children and making it a child of the grandparent.

In Promoting, a node chooses one of its children and makes it a child of the grandparent (FIG. 4). If the node is the root, Promoting has no effect. Otherwise Promoting has the effect of flattening the hierarchy. It is appropriate for children that meet one of two conditions: either the child's homogeneity is less than that of the active node (violating the HMC), or the child's contribution to the active node's homogeneity is external (thus increasing the active node's dispersion, and violating the DMC). The effect of Promoting is to move misplaced nodes up the hierarchy until they meet other nodes with which they are more suitably associated.

Figure 5:
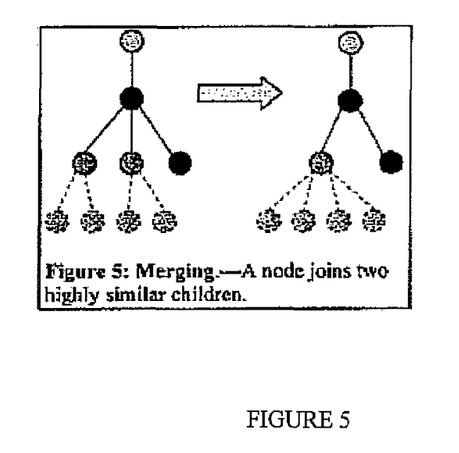
FIG. 5 illustrates merging; a node choosing some of its children and combines them into a single node.

Merging is the mechanism that combines nodes into other nodes. In Merging, a node chooses some of its children and combines them into a single node (FIG. 5). (For the sake of concreteness we describe our preferred implementation in which two children are merged, but it will be apparent to one skilled in the art that a larger set of children could be merged at a single step without departing from the spirit of the invention.) Merging has the effect of making the hierarchy deeper. It is appropriate when two of a node's children are unusually similar to one another, compared with the node's overall homogeneity. As the Figure shows, if either of the nodes being merged is internal, their children are combined. A new internal node is added only when two documents are merged.

Thus the general dynamic of HAC is that subtrees climb upward to remove themselves from branches where they do not belong, and then merge their way back down into more appropriate associations. This vision of nodes moving opportunistically up and down the tree in response to homogeneity estimates is analogous to the movement of ants in ant clustering on the basis of document similarity, and motivates our comparison of the two methods.

To support useful promoting and merging, the average branching factor k of a hierarchy should be at least 3. Promoting and merging each reduce the branching factor of the node to which they are applied by 1. If the node's original branching factor is 2, either operation will leave it with a branching factor of 1, making it superfluous. If it is dropped, the hierarchy will return to the same structure it had before the operation was performed. Since the optimal k is 3, this limitation is not a concern.

Promoting and Merging are sufficient to support the basic characteristics of Any-Time, Dynamic, Distributed hierarchical clustering.

Distributed.—Because a node can estimate H locally, it can sense the HMC and DMC locally, and thus make decisions to promote or merge its children without affecting any nodes other than its parent and its children. Thus many nodes in the hierarchy can execute concurrently on different processors. We envision the nodes (root, internal, and leaves) being distributed across as many processors as are available.

Dynamic.—Classical algorithms for hierarchical clustering presume that the structure is correct at every step. Promote and Merge assume that it is incorrect and take local actions to improve it. Promoting moves nodes that are in an inappropriate branch of the hierarchy higher up, to a more general level. Merging joins together nodes that are very similar, thus growing hierarchical structure downward. As these processes execute concurrently over the nodes of the hierarchy, nodes continually climb up and down the hierarchy, finding their best place in the overall structure. New leaf nodes can be added anywhere to the structure, and will eventually find their way to the right location, If the similarity measure changes, nodes will relocate themselves to account for the changed measure, while taking advantage of any of the existing structure that is still appropriate.

Any-Time.—Because the algorithm dynamically corrects errors, it never needs to be restarted. The longer it runs, the better the structure becomes. Empirically, it converges exponentially after a short initialization period, and its characteristics are very similar to those of our flat clustering algorithm, for whose exponential convergence we have a theoretical analysis [19]. Thus one can consult the structure at any time for retrieval purposes.

This summary raises several important questions. These include:
1. How can similarity among children be determined in a decentralized implementation without constantly descending to the leaves?
2. Precisely what criteria does a node use when determining which children to promote or merge?
3. How can this system be distributed? In particular, what happens if two nodes that execute concurrently share the same parent, or if one is the parent of the other?
4. How can this system be initialized when there is no existing hierarchy?
5. How can new documents be added to the system as it runs?
6. How can the similarity function be changed as the system runs?

The following subsections discuss these issues.

Measuring Homogeneity

The basic decisions of a node are based on its estimate of its homogeneity and that of its children. An exact homogeneity measure for a node reflects the similarity of all of the documents subsumed by the node. We could compute such a measure by walking down the tree from the node to collect all of the documents and computing (for example) their average pairwise similarity, but doing so would compromise the Distributed property, particularly for nodes close to the root.

Let us posit the existence at each node of its Summary, a fixed-length data structure that summarizes the content of all of the documents that descend from that node. Functionally, we require that if we know the Summaries associated with a set of nodes, we can estimate their similarity with one another, and thus the Homogeneity of a node that has them as its children. Because the Summary can be stored locally at a node, all homogeneity computations can be performed locally, without descending to the leaves.

We have identified two feasible Summaries. One provides only approximate homogeneity computations, but experiments show that it is sufficient to guide the system. The other is exact, in the sense that it yields the same homogeneity that would be computed by collecting the leaves. For concreteness, we assume that each document is characterized by a concept vector of length L, as in our ant-based partitioning algorithm. Without loss of generality, we assume that entries in this vector are reals in [0,1]. Thus each document $\vec{d}_i$ is a vector in $[0,1]^L$. In either case, we envision that documents may be added randomly anywhere in the tree. If they are added to nodes far from the root, the changes to the summaries of those nodes will need to percolate up to higher-level nodes. We envision this percolation taking place when a node is activated, as described below.

Approximate Summary: Vector Sum

One possible definition of homogeneity is the average pairwise similarity of a node's descendants. Supporting this definition, node i's summary summ(i) is the vector sum $$\sum_{d \in desc(i)} \vec{d}.$$

If the descendants have some similarities among themselves, the resulting vector will tend to point in that direction, and can be used to compute cosine similarities with other vectors. Because we do not normalize summ(i), we can compute the exact summary for a higher-level node by summing the summaries at its children.

The vector sum as a node summary has two weaknesses.

First, it cannot handle a set of null vectors, since the angle between two null vectors is not defined.

Second, it does not distinguish between a set of similar nodes that all attest many elements of the concept space, and a set of dissimilar nodes that collectively attest many element of the concept space. Two nodes, each with heterogeneous sets of descendants, will have summary vectors many of whose elements will be non-zero. The cosine between these summaries will be correspondingly high, even though the average pairwise cosine similarity across the set of documents in question will be very low. This feature of the vector sum is a problem if highly heterogeneous nodes arise. In practice, clustering proceeds bottom-up from merging similar documents, so highly heterogeneous nodes are not generated, and our experimental cases converge even using this approximate summary.

Exact Summary: Mutual Information

Our notion of homogeneity does not require beginning with pairwise similarities. Any metric of the homogeneity of an arbitrary set would be appropriate, and would yield pairwise similarities as the case where the set has two members. A reasonable approach to estimating the homogeneity of a set is to measure the mutual information among the members of the set.

A proprietary computation due to Richard Rohwer [21] provides a useful instance of such a measure. It has two important characteristics.
1. It can be computed from a fixed-size summary at each node, without the need to retrieve the individual documents.
2. The value of this measure obtained from summaries is exactly the same as that computed directly from knowledge of the individual documents.

Details on Promoting and Merging

Now we consider the processes of promoting and merging in more detail. A node must make three sequential decisions when it is activated. Each of these decisions can be made in several different ways.
1. Should it invest cycles in detailed computation for promoting and merging??
2. Which children should it consider for promoting and merging?
3. How should the decision to promote or merge a given candidate child be made?

In addition, each time a node is activated, it recomputes its summary based on its children, and passes the new values up to its parent (the grandparent). Other useful information (such as the minimum and maximum depth to the node's descendants) can be passed up at the same time.

Deciding Whether to Compute

When a node is activated, it has the option of promoting, merging, or both. If every node is running on its own processor, it can continually evaluate these alternatives. In most cases, several nodes will share a processor, and not all nodes are equally worthy of execution. In these cases, it makes sense for the node to make a deliberate decision whether to invest the cycles in further processing. There are several ways to make this decision.
1. In our current implementation, the node always tries both actions.
2. This kind of decision is an ideal candidate to modulate with pheromone learning [18]. Two classes of information can guide the pheromone learning process.
    a. Both promoting and merging depend on three characteristics of a grandparent, node, and children: the relative homogeneity of the children and the active node, the contribution of the children to the node's homogeneity, and the branching factor k of the active node and the grandparent. A quick assessment of one or more of these factors can provide evidence as to whether full computation is likely to lead to an improved structure.
    b. An important motivation for seeking a hierarchy is to facilitate document retrieval, and we would like to optimize the structure of the hierarchy in terms of the current demands of the retrieval process. We do retrieval using ant-like agents that lay pheromones as they return to the root, reflecting the value of what they have found. The presence of such pheromones indicates that a given branch of the hierarchy is important to the search process and merits the processing to refine its structure further.

Selecting Candidates

If the decision to promote or merge, Sections 0 and 0, are made using a Boltzmann-Gibbs function as recommended below, the selection of candidates need not be made independently of the decision to promote or merge. Otherwise the various approaches a node can use to selecting children for promote and merge operations fall along a continuum between deterministic and random.

1. The deterministic extreme requires the node to consider all of its children.
   a. As a candidate for promotion, it first selects any child whose homogeneity is less than itself (choosing the child with lowest homogeneity if there are more than one). If all children have homogeneity greater than that of the node, it selects the child whose contribution to the node's homogeneity is external.
   b. As candidates for merger, it selects the two most similar children. Since nodes tend to have few children, this computation need not be onerous, and it is the one we use in our current implementation.
2. At the other extreme, the node can randomly select a single child (to promote) or two children (to merge), recognizing that whether or not the action takes place will depend on examination of the candidates. This approach minimizes the length of the execution cycle of a single node but requires more node cycles to converge.
3. Intermediate versions can be achieved by randomly selecting some subset of a node's children and then applying the deterministic method to that subset.

Deciding to Promote

Whether the node actually promotes a child depends on whether the child is more or less homogeneous than the active node, the child's contribution to the node's homogeneity, and the relative branching factors of the node and the grandparent. The node could make this decision deterministically, promoting any child less homogeneous than itself, and otherwise any child whose contribution to its homogeneity exceeds some threshold. There are reasons to avoid a deterministic decision.

Sometimes we may not want to promote a child that is more homogeneous than its parent. For example, our homogeneity estimate for its parent may be inexact, because the underlying population of documents has changed and details of those changes have not yet propagated up to the parent, which may be less homogeneous than our measures suggest.

In general, strictly deterministic decisions are inimical to self-organizing systems because they can lead the system to get stuck in local optima. A small degree of randomness can break deterministic symmetries and allow the system to continue to organize.

Thus we soften this decision using a probabilistic distribution. We consider three cases, based on the reason for which the child was selected for promotion, then present an integrated mechanism. The measures and computational details given here are by way of example, and it will be apparent to one skilled in the art that analogous measures and computations can be used without departing from the spirit of the invention.

If the child is more homogeneous than the active node, let H(n) be the node's homogeneity, and H(c) the homogeneity of the child. Then the likelihood that the node promotes the child increases with the ratio of H(n)/H(c). In our preferred implementation, we use a Boltzmann-Gibbs distribution to compute the probability of promotion of the child:

$$\frac{e^{H(n)/T}}{e^{H(n)/T} + e^{H(c)/T}}$$

where T is a temperature parameter. When T is very small, this function tends to a step function that is 1 when H(n)>H(c) and 0 otherwise, so the child is promoted exactly when it is less homogeneous than its parent. When T is very large, the decision to promote the child becomes essentially random. Between these extremes, the probability is 50% when the two homogeneities are equal, and tends to 1 or 0 as they grow farther apart.

If the child's contribution to the node's homogeneity cont is external, its absolute value is in [0,1]. The closer it is to 1, the greater our desire to promote it. Our preferred implementation is the Boltzmann-Gibbs function, promoting the child with probability $$\frac{e^{|cont|/T}}{e^{1/T}} = e^{-(1-|cont|)/T}$$

Let $k_n$ be the branching factor of the node and $k_g$ the branching factor of the grandparent. If we are seeking to maintain a balanced tree with constant branching factor k, we should favor promotion when $k_n > k_g$. Our preferred implementation is the Boltzmann-Gibbs function, promoting the child with probability $$\frac{e^{k_n/T}}{e^{k_n/T} + e^{k_g/T}}$$

This mechanism can readily be extended to promote a particular value of k (such as the value 3 that optimizes search time).

We can combine the selection of a node to promote with the decision to promote. The probability to promote a given child depends on:
  The relation between the child's homogeneity and the active node's, $\Delta H = H(c) - H(n) \in [-1, 1]$, where a positive value should encourage promoting and a negative value should discourage it;
  The child's contribution cont $\in [-1, 1]$ to the node's homogeneity, where a high absolute value should encourage promoting and a low absolute value should discourage it;
  The relation between the node's branching factor and that of its parent, $\Delta k = (k_n - k_g)/\text{Max}(k_n, k_g) \in [-1, 1]$, where a positive value should encourage promoting and a negative value should discourage it.

We combine these into a single decision parameter, $q = (1 - \alpha - \beta)\Delta H + \alpha |cont| + \beta \Delta k$, where $\alpha, \beta \in [0, 1]$ are weighting factors ($\alpha + \beta \leq 1$). Select a child j for promoting from the set of all of the children of node n with probability that increases with the value of this parameter. Our preferred implementation uses the Boltzmann-Gibbs function, giving the probability of selecting each child for promoting as $$\frac{e^{q_j/T}}{\sum_{i \in children(n)} e^{q_i/T}}$$

The parameter q can also guide the probability of whether the selected child is actually promoted. $q \in [-1, 1]$, so we promote with probability $$\frac{e^{(1+q)/T}}{e^{2/T}} = e^{(q-1)/T}$$

Deciding to Merge

Whether a node actually merges two children or not depends on three factors analogous to those involved in the decision to promote: relative homogeneity, contribution to the active node's homogeneity, and branching factor, this time computed with respect to the new node that would be generated by merging two children. The measures and computational details given here are by way of example, and it will be apparent to one skilled in the art that analogous measures and computations can be used without departing from the spirit of the invention.

Again, to accommodate the dynamic addition and deletion of documents and to enhance the system's ability to self-organize, our preferred implementation uses a Boltzmann-Gibbs function to soften the decision. We contemplate merging two children into a merged node m. The probability of this merger should increase with:

The difference between the merged node's homogeneity and the active node's, $\Delta H = H(m) - H(n) \in [-1, 1]$, where a positive value should encourage merging and a negative value should discourage it;

The difference between the absolute value of the merged node's contribution to the node's homogeneity and the average of the absolute values of the contributions of the two children that are to be merged $\Delta c = (|cont_1| + |cont_2|)/2 - |cont_m| \in [-1, 1]$, where a positive value should encourage merging and a negative value should discourage it;

The relation between the node's branching factor before the merger and that of merged node, $\Delta k = (k_n - k_m)/\text{Max}(k_n, k_m) \in [-1, 1]$, where a positive value should encourage merging and a negative value should discourage it.

As before, these can be applied individually, or combined into a single decision factor. In our preferred implementation, we combine these into a single parameter, $q = (1-\alpha-\beta)\Delta H + \alpha \Delta c + \beta \Delta k$, where $\alpha, \beta \in [0, 1]$ are weighting factors ($\alpha + \beta \leq 1$). The node executes the merger with probability $$\frac{e^{(1+q)/T}}{e^{2/T}} = e^{(q-1)/T}$$

where T is a temperature parameter (not necessarily the same temperature as that used in the promotion decision). When T is very small, this function tends to a step function that is 1 when q>0 and 0 otherwise, so the children are merged exactly when their merger would improve the three components of the decision criterion. When T is very large, the decision to merge the children becomes essentially random. Between these extremes, the probability is 50% when q=0, and tends to 1 or 0 as |q| increases in value.

Other Practical Issues

System Initialization

Because the system is continually correcting its structure, any initial allocation of documents to nodes is an acceptable starting point. Here are two possible approaches:

1. Assign all documents as children of root. Initially, only root will be chosen for activation. No promotions will happen (or alternatively, we can assign root as its own parent, and then promotion can take place without affecting the structure of the tree). Only mergers will occur. The nodes generated as a result of mergers will then have a chance to be selected, and meaningful promotions as well as mergers can take place. With a large set of documents, this approach requires stochastic selection of candidates for early mergers.

2. Generate a random tree, and assign documents randomly to the various nodes of the tree. This approach permits limiting the number of documents at each node in the tree, thus constraining the computation to be done at each iteration.

Adding New Documents

Documents can be added anywhere in the tree, If nodes are distributed across different computers in a peer-to-peer network, documents may be randomly assigned to nodes on the computer where they originate, and will move up and down when their parents are activated until they find a comfortable home. Alternatively, documents can be inserted at the root, and will then merge their way down the tree to the appropriate position.

Changing the Similarity Metric

The underlying similarity function governing the structure of the model is reflected in two ways. First, it determines the set of key words or concepts that are used to characterize each document. Second, it defines the behavior of foraging agents (Section 0) that search the hierarchy. If the change is not too great, the system will adapt, retaining those aspects of the old hierarchy that are still useful and migrating nodes that no longer belong to new positions.

Conflicting Node Activation

When a node is activated, it can promote or merge its children. Merging changes the state of the merged children, while promotion changes the state of the child and the parent. What happens if two nodes that are activated concurrently (say, on separate processors) are related as parent and child? There are at least two possible solutions.

1. A simple semaphore system can avoid conflicts.

2. Whichever activation completes last will win. This may lead to some nodes being in undesirable locations, but the algorithm will correct this in later cycles.

Searching

Ants construct efficient paths between their nests and food sources by depositing chemicals (pheromones) on the ground whenever they are carrying food, and by climbing the gradient of these chemicals whenever they are searching for food. As many ants discover food and deposit pheromones, discrete pheromone paths emerge that guide the ants' otherwise random movements toward food sources. Our preferred method for searching the hierarchies constructed by HAC emulates this foraging behavior, so we call it "information foraging."

Each document in HAC is a leaf in the tree, and the similarity of documents under each node increases as one descends the tree from the root to the leaves (the HMC). In information foraging, an analyst model or query model generates a stream of forager agents. Each forager agent begins at the root and descends the tree until it reaches a leaf. Then it evaluates a function that computes the relevance of the document that it has found to the higher-level query. This relevance score is deposited at the leaf, and propagates back up the tree toward the root, combining with any other relevance deposits from foragers representing the same model, and diminishing in strength with each step. As successive foragers descend the tree, they select their path at each node stochastically by evaluating a Boltzmann-Gibbs distribution weighted by the relevance scores at each of the accessible next steps. The relevance scores function like ant pheromones, building up paths for later foragers to follow.

In general, searching for a data item in a population of size N requires time on the order of N (look at each item in turn until you find the one you want). If the items can be ordered linearly by their relevance, one can do the search in time logarithmic in N, but a single linear order is not realistic for most documents of interest to intelligence analysis. In our foraging system, the maximum length of the relevance path to documents of interest is the depth of the tree, which is logarithmic in the total number of documents (where the base of the logarithm is the mean branching factor at each node). Thus we achieve searching efficiencies comparable to those for linearly ordered data, even for data that cannot be usefully constrained to a total order.

Performance

The performance of HAC can be evaluated using several different metrics. These are of two types. The first set consists of aggregations of node-level metrics. The second set is evaluated directly on the overall hierarchy. These metrics can be used to estimate system convergence, and thus to drive pheromone learning of node activation.

Node-Level Metrics

These can be aggregated into system-level metrics by reporting a measure of location (such as mean or median) and of spread (such as inter-quartile spread or variance). Most of these are defined only for non-leaf nodes, over which averages should be computed.

Homogeneity.—We seek to achieve high average homogeneity across nodes. Though homogeneity is defined for all nodes including leaves, leaf homogeneity is constant at 1, so it is preferable to omit leaves in computing average homogeneity.

Homogeneity gain.—In a well-ordered hierarchy, $H(c) > H(n)$ for each child C of each node n. This difference is the homogeneity gain of a node with respect to its child, and we seek to maximize this gain over the entire tree. There are at least two ways to compute an overall average homogeneity gain.

1. We might compute for each node the difference between its homogeneity and the average homogeneity of its children. Experimentally, we find that this value does not reflect convergence accurately.
2. We obtain better results by averaging the quantities $H(c)-H(n)$, so that each (node, child) pair contributes one value to the average.

Dispersion.—We seek to minimize dispersion over the entire tree.

Branching factor.—Search is most efficient if k is relatively constant throughout the tree, so we seek to minimize the spread of this value. While we can enforce a fixed k using mechanisms similar to those discussed earlier, our current algorithms do not, permitting k to emerge naturally at each node, for reasons discussed earlier.

System-Level Metrics

Ultrametric.—The ultrametric distance between two documents is their separation in the hierarchy, and ranges from 2 (for siblings) to twice the overall depth of the tree. For each document in the population, we identify the n documents that have the lowest ultrametric separation from it, breaking ties by selecting the documents that are most homogeneous with it. Then compute the homogeneity of this set of n+1 documents. Report the average of this measure across all documents in the set.

Seekers.—The function of the hierarchy is to support search, so a direct (although time-consuming) measure of its structure is a search process. For each document in the population, we prepare 9 seekers with the same concept vector. Seekers follow the clustering hierarchy from the root to a leaf, selecting among the children at each node following a Boltzmann-Gibbs distribution based on the similarity between the seeker and the child. The seeker metric is the proportion of seekers that terminate their search at a document to which their similarity is at least 0.95.

REFERENCES

[1] J. Beal. Leaderless Distributed Hierarchy Formation. AIM-2002-021, MIT, Cambridge, Mass., 2002. http://www.swiss.ai.mit.edu/projects/amorphous/papers/AIM-2002-021.ps.

[2] E. Bonabeau, G. Theraulaz, V. Fourcassié, and J.-L. Deneubourg. The Phase-Ordering Kinetics of Cemetery Organization in Ants. *Physical Review E*, 4:4568-4571, 1998. http://www.santafe.edu/research/publications/workingpapers/98-01-008.ps.

[3] L. Chen, X. Xu, Y. Chen, and P. He. A Novel Ant Clustering Algorithm Based on Cellular Automata. In *Proceedings of International Joint Conference on Web Intelligence and Intelligent Agent Technology (WI'04 and IAT'04)*, Beijing, PRC, 2004.

[4] J. L. Deneubourg, S. Goss, N. Franks, A. Sendova-Franks, C. Detrain, and L. Chretien. The Dynamics of Collective Sorting: Robot-Like Ants and Ant-Like Robots. In J. A. Meyer and S. W. Wilson, Editors, *From Animals to Animats: Proceedings of the First International Conference on Simulation of Adaptive Behavior*, pages 356-365. MIT Press, Cambridge, Mass., 1991.

[5] C. Fellbaum, Editor. *WordNet: An Electronic Lexical Database (Language, Speech, and Communication)*. Cambridge, Mass., MIT, 1998.

[6] J. Handl, J. Knowles, and M. Dorigo. Ant-based clustering: a comparative study of its relative performance with respect to k-means, average link and 1d-som. TR-IRIDIA-2003-24, IRIDIA, 2003. http://wwwcip.informatik.uni-erlangen.de/~sijuhand/TR-IRIDIA-2003-24.pdf.

[7] J. Handl and B. Meyer. Improved ant-based clustering and sorting in a document retrieval interface. In *Proceedings of Parallel Problem Solving from Nature (PPSN VII)*, Springer, 2002. http://dbk.ch.umist.ac.uk/handl/HandlMeyerPPSN2002.pdf.

[8] K. M. Hoe, W. K. Lai, and T. S. Y. Tai. Homogeneous Ants for Web Document Similarity Modeling and Categorization. In *Proceedings of Ants* 2002, 2002. http://www.informatik.uni-trier.de/ley/db/conf/antalg/antalg2002.html.

[9] A. K. Jain, M. N. Murty, and P. J. Flynn. Data Clustering: A Review. *ACM Computing Surveys*, 31(3), 1999.

[10] P. M. Kanade and L. O. Hall. Fuzzy Ants as a Clustering Concept. In *Proceedings of the 22nd International Conference of the North American Fuzzy Information Processing Society (NAFIPS03)*, pages 227-232, 2003. http://www.csee.usf.edu/%7Ehall/papers/nafips03.pdf.

[11] P. Kuntz and P. Layzell. An Ant Clustering Algorithm Applied to Partitioning in VLSI Technology. In *Proceedings of Fourth European Conference on Artificial Life*, pages 417-424, MIT Press, 1997. http://www.informatics.sussex.ac.uk/users/adrianth/lazwebpag/web/Publications/ECAL9 7/ecalps.ps.

[12] E. D. Lumer and B. Faieta. Diversity and Adaptation in Populations of Clustering Ants. In *Proceedings of Third Conference on Simulation of Adaptive Behavior (SAB94)*, MIT Press, 1994.

[13] G. A. Miller. WordNet: A Lexical Database for the English Language. 2002. Web Page, http://www.cogsci.princeton.edu/~wn/.

[14] N. Monmarché. On data clustering with artificial ants.

[15] E. Ogston, B. Overeinder, M. V. Steen, and F. Brazier. A Method for Decentralized Clustering in Large Multi-Agent Systems. In *Proceedings of Second International Joint*

*Conference on Autonomous Agents and Multi-Agent Systems*, Melbourne, Australia, pages 789-796, 2003. http://citeseer.ist.psu.edu/ogston03method.html.

[16] C. F. Olson. Parallel Algorithms for Hierarchical Clustering. *Parallel Computing*, 21:1313-1325, 1995. http://citeseer.ist.psu.edu/olson95parallel.html.

[17] S. A. Oprisan. Task Oriented Functional Self-Organization of Mobile Agents Team: Memory Optimization Based on Correlation Feature. In *Proceedings of Ant Colony Optimization and Swarm Intelligence (ANTS 2004)*, Brussels, Belgium, pages 398-405, Springer, 2004. http://springerlink.metapress.com/openurl.asp?genre=article&issn=0302-9743&volume=3172&spage=398.

[18] H. V. D. Parunak, S. A. Brueckner, R. Matthews, and J. Sauter. Pheromone Learning for Self-Organizing Agents. *IEEE SMC*, 35(3 (May)):316-326, 2005. http://www.altarum.net/~vparunak/ParunakIEEE.pdf.

[19] H. V. D. Parunak, S. A. Brueckner, J. A. Sauter, and R. Matthews. Global Convergence of Local Agent Behaviors. In *Proceedings of fourth International Joint Conference on Autonomous Agents and Multi-Agent Systems (AAMAS05)*, Utrecht, The Netherlands, pages (forthcoming), 2005. http://www.altarum.net/~vparunak/AAMAS05Converge.pdf.

[20] V. Ramos and A. Abraham. Evolving a Stigmergic Self-Organized Data-Mining. In *Proceedings of 4th Int. Conf. on Intelligent Systems, Design and Applications (ISDA-04)*, Budapest, Hungary, pages 725-730, 2004. http://alfa.ist.utl.pt/~cvrm/staff/vramos/ref_50.html.

[21] R. Rohwer. Summary Statistics to Support Information-Based Distributed Hierarchical Clustering. FairIsaac, San Diego, Calif., 2005.

[22] S. Schockaert, M. de Cock, C. Cornelis, and E. E. Kerre. Efficient Clustering with Fuzzy Ants. In *Proceedings of Ant Colony Optimization and Swarm Intelligence (ANTS 2004)*, Brussels, Belgium, pages 342-349, 2004. http://springerlink.metapress.com/openurl.asp?genre=article&issn=0302-9743&volume=3172&spage=342.

[23] B. Walsham. *Simplified and Optimized Ant Sort for Complex Problems: Document Classification*. Bachelor of Software Engineering Thesis at Monash University, Department of School of Computer Science and Software Engineering, 2003. http://www.csse.monash.edu.au/hons/se-projects/2003/Walsham/Benjamin_Walsham_Thesis_Main.pdf.

We claim:

1. A method of modifying a hierarchy of nodes containing data elements, the hierarchy comprising a root node at the top of the hierarchy, a plurality of leaf nodes at the bottom of the hierarchy, and a plurality of internal nodes interconnecting the leaf nodes to the root, where each internal node is connected to a single parent node upwardly in the hierarchy and one or more child nodes downwardly in the hierarchy, the method comprising the steps of:
   (a) selecting an internal node as an active node;
   (b) analyzing the parent and any children of the active node with a computer algorithm to identify similarities in the data elements stored therein;
   (c) moving or merging one or more of the children nodes based upon the analysis of step (b), wherein
   a child of an active node is promoted to become a sibling of the active node if the child is similar to the parent of the active node, and
   two or more children of the active node are merged into a single child node of the active node if the children are similar to each other;
   (d) selecting a subsequent internal node as the active node, and repeating steps (a)-(c);
   whereby multiple nodes are moved or merged within the hierarchy to transform the hierarchy into a clustered hierarchy characterized in that the similarity among the data elements subsumed under any node of the hierarchy increases from the root of the hierarchy downwards.

2. The method of claim 1, including the steps of:
accessing the clustered hierarchy while the computer algorithm is running; and
yielding useful approximate clusters to improve their quality as the process continues to run.

3. The method of claim 1, including the step of executing the algorithm across multiple parallel computer processors.

4. The method of claim 1, including the step of providing a node-based summary supporting homogeneity estimates.

5. The method of claim 4, wherein the node-based summary is based on sums of vectors representing individual data elements.

6. The method of claim 4, wherein the node-based summary is based on mutual information statistics across the data elements.

7. The method of claim 4, in which a node's decision to compute is deterministic.

8. The method of claim 4, in which a node's decision to compute is stochastic.

9. The method of claim 1, in which all of a node's children are considered in selecting candidates for promoting and merging.

10. The method of claim 1, in which a randomly chosen subset of a node's children are considered in selecting candidates for promoting and merging.

11. The method of claim 1, in which the decision to promote a child is based on some combination of the relative homogeneity of the node and its children, the contribution of the children to the node's homogeneity, and the branching factors of the node and its parent and children.

12. The method of claim 1, in which the decision to merge some of a node's children is based on some combination of the relative homogeneity of the node and the resulting merged node, the contribution of the merged node to the active node's homogeneity, and the branching factors of the node and its parent and the new merged node.

13. The method of claim 1, including the step of adding new data elements to the root.

14. The method of claim 1, wherein step (a) is initialized by generating a random hierarchy of nodes to which data elements are assigned.

15. The method of claim 1, including the step of adding new data elements to various internal nodes within the current state of the hierarchy.

16. The method of claim 1, in which simultaneous activation of neighboring nodes is prevented using semaphores or similar mechanisms.

17. The method of claim 1, in which neighboring nodes are allowed to activate simultaneously and the self-organizing process is permitted to resolve any resulting conflicts.

18. The method of claim 1, wherein the selection of the active node is at least partially random.

19. The method of claim 1, wherein multiple nodes may be active simultaneously.

20. The method of claim 1, wherein an active node remains continuously active.

21. The method of claim 1, wherein the subsequent active node is a node other than the last active node.

* * * * *